United States Patent
McCluney et al.

(10) Patent No.: US 10,332,282 B2
(45) Date of Patent: Jun. 25, 2019

(54) SYSTEM AND METHOD FOR FRAGMENTED REVEAL OF A MULTIMEDIA CONTENT

(71) Applicant: INCUBATE MESSENGER, INC., Atlanta, GA (US)

(72) Inventors: Michael McCluney, Atlanta, GA (US); Adam Ellenbogen, Clifton Park, NY (US)

(*) Notice: Subject to any disclaimer, the term of this patent is extended or adjusted under 35 U.S.C. 154(b) by 0 days.

(21) Appl. No.: 14/840,105

(22) Filed: Aug. 31, 2015

(65) Prior Publication Data

US 2016/0379383 A1    Dec. 29, 2016

Related U.S. Application Data

(60) Provisional application No. 62/184,030, filed on Jun. 24, 2015.

(51) Int. Cl.
*G06T 11/20* (2006.01)

(52) U.S. Cl.
CPC .................. *G06T 11/20* (2013.01)

(58) Field of Classification Search
None
See application file for complete search history.

(56) References Cited

U.S. PATENT DOCUMENTS

| | | | |
|---|---|---|---|
| 7,200,388 B2 * | 4/2007 | Deeds | H04M 1/72544 380/255 |
| 7,755,566 B2 | 7/2010 | Hoisko | |
| 8,954,425 B2 | 2/2015 | Xiao et al. | |
| 2002/0016776 A1 * | 2/2002 | Chu | H04N 21/2543 705/52 |
| 2005/0159212 A1 * | 7/2005 | Romney | G07F 17/3288 463/25 |
| 2009/0146961 A1 * | 6/2009 | Cheung | G06F 3/0219 345/172 |
| 2009/0322761 A1 * | 12/2009 | Phills | A63F 13/10 345/473 |
| 2010/0255890 A1 | 10/2010 | Mikkelsen et al. | |
| 2010/0318890 A1 * | 12/2010 | Billharz | G06F 17/246 715/212 |
| 2011/0035662 A1 | 2/2011 | King et al. | |
| 2011/0041055 A1 * | 2/2011 | Heute | G06F 17/2288 715/243 |
| 2013/0198177 A1 | 8/2013 | Oldham et al. | |

(Continued)

OTHER PUBLICATIONS

Joe Lambert, "Flux Slider", 2011, URL: http://www.joelambert.co.uk/flux/.*

(Continued)

*Primary Examiner* — David H Chu
(74) *Attorney, Agent, or Firm* — Bekiares Eliezer LLP

(57) ABSTRACT

A method and system are described for fragmented presentation of a media content, such as a digital picture. In an exemplary embodiment, the media content is rendered on a display of a recipient portable computing device, such as a smartphone. Simultaneously, a masking layer is rendered on the display "over the top" of the multimedia content. The mask layer obscures the presentation of the media content such that removal of the mask layer, one fragment at a time over a period of time, operates to present portions of the media content rendered below each fragment.

20 Claims, 5 Drawing Sheets

(56) References Cited

U.S. PATENT DOCUMENTS

| | | | | |
|---|---|---|---|---|
| 2013/0342470 A1* | 12/2013 | Acar | ............... | G09B 5/062 |
| | | | | 345/173 |
| 2014/0357362 A1* | 12/2014 | Cohen | ............... | A63F 13/216 |
| | | | | 463/31 |
| 2015/0058242 A1 | 2/2015 | Bucciarelli | | |
| 2015/0312631 A1* | 10/2015 | Schneider | ............. | H04N 21/84 |
| | | | | 725/110 |

OTHER PUBLICATIONS

Brandt et al.: "Lowering the Burden for Diary Studies Under Mobile Conditions", Stanford University HCI Group, Dec. 31, 2007, accessible at http://hci.stanford.edu/cstr/reports/2007-01.pdf.

\* cited by examiner

SYSTEM AND METHOD FOR FRAGMENTED REVEAL OF A MULTIMEDIA CONTENT

CROSS REFERENCE TO RELATED APPLICATIONS

This application claims priority under 35 U.S.C. § 119(e) to U.S. provisional application entitled "SYSTEM AND METHOD FOR FRAGMENTED REVEAL OF A MULTIMEDIA CONTENT (SNIPPET)," filed on Jun. 24, 2015 and assigned application Ser. No. 62/184,030, the entire contents of which are hereby incorporated by reference.

BACKGROUND

Portable computing devices ("PCDs"), such as cellular telephones and other "smart" devices, have become ubiquitous in today's society. Users rely on their PCDs for everything from communication to entertainment to retrieving data from the Internet. Indeed, for many PCD users, the PCD is their primary tool for connection to others through the digital world. Today's PCDs may be used for, among other things, telecommunications, short messaging services, social networking and email.

A very common use of PCDs involves a first user taking a picture with his PCD and then leveraging the PCD's short messaging functionality to forward the picture to a second user via a "text" message. As one of ordinary skill in the art would understand, short messaging service ("SMS") technology may be used to route a multimedia content (e.g., a picture and/or a text-based message) from one PCD to another. The receiving PCD may be used to render the multimedia content for the benefit of its user (i.e., by displaying the content on a display component).

Currently, when a PCD receives a multimedia content, such as via a text message, the entire multimedia content may be rendered fully upon receipt. Consequently, senders of multimedia content are not presently able to dictate the manner and timing of how the multimedia content is rendered to the user of a receiving PCD. If a sender could dictate the manner and timing of how a multimedia content is rendered by a receiving device, options for communication between PCD users may be improved. Therefore, what is needed in the art is a system and method for a time-driven, fragmented display of a multimedia content.

SUMMARY OF THE DISCLOSURE

A method and system are described for fragmented presentation of a media content, such as a digital picture. In an exemplary embodiment, the media content is rendered on a display of a recipient portable computing device, such as a smartphone. Simultaneously, a masking layer is rendered on the display "over the top" of the multimedia content. The mask layer obscures the presentation of the media content such that removal of the mask layer, one fragment at a time over a period of time, operates to present portions of the media content rendered below each fragment.

The construction and removal of the mask layer is driven by a snippet algorithm. Depending on the particular snippet algorithm, a mask layer construction may be comprised of any number of fragments, any level of opaqueness, etc. Moreover, depending on the particular snippet algorithm, a mask layer removal may be accomplished according to any duration of time between fragment removals, per any designated order or randomization of fragment removals, etc. Also, in some embodiments a snippet algorithm may be modified by a user such that the construction and/or removal of a mask layer is adjusted from a default setting(s). For instance, in some embodiments of the solution, a default snippet algorithm may be modified in the event that a user pays a fee, or views an advertisement, or enters a certain geographical zone, etc.

BRIEF DESCRIPTION OF THE DRAWINGS

In the Figures, like reference numerals refer to like parts throughout the various views unless otherwise indicated. For reference numerals with letter character designations such as "102A" or "102B", the letter character designations may differentiate two like parts or elements present in the same figure. Letter character designations for reference numerals may be omitted when it is intended that a reference numeral to encompass all parts having the same reference numeral in all figures.

DETAILED DESCRIPTION

Figure 1:
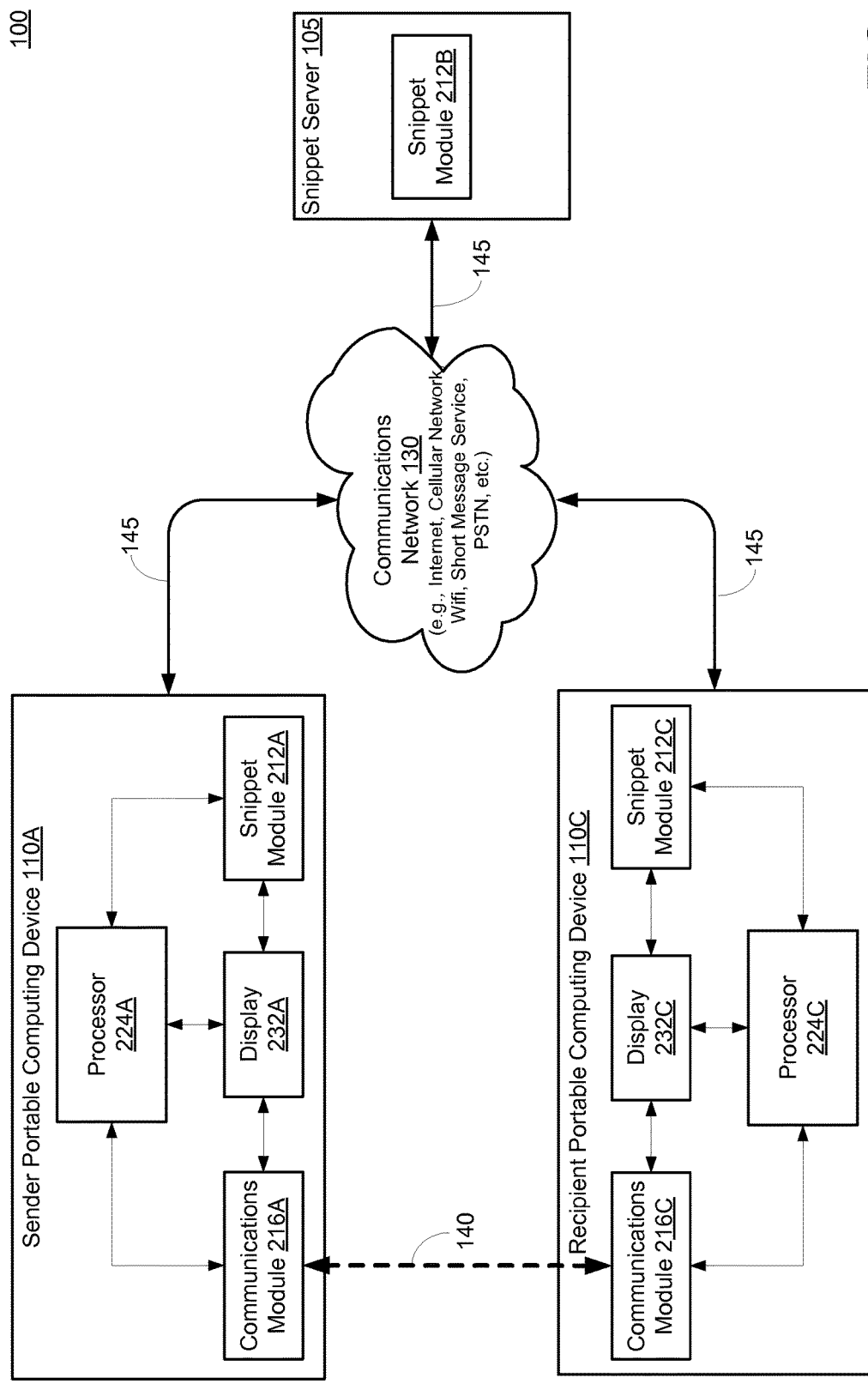
FIG. 1 is a high level diagram illustrating exemplary components of a system for fragmented reveal of a multimedia content ("FRMC")

The word "exemplary" is used herein to mean "serving as an example, instance, or illustration." Any aspect described herein as "exemplary" is not necessarily to be construed as preferred or advantageous over other aspects.

In this description, the terms "application," "algorithm," and the like may envision files having executable content, such as: object code, scripts, byte code, markup language files, and patches. In addition, an "application" or "algorithm" referred to herein, may also include files that are not executable in nature, such as documents that may need to be opened or other data files that need to be accessed. Further, an "application" or "algorithm" may be a complete program, a module, a routine, a library function, a driver, etc.

The terms "content" and "multimedia content" and "multimedia presentation" are used herein interchangeably in reference to a digital file that is captured or otherwise created by a sender device and transmitted to one or more recipient devices for rendering to the user(s) of the recipient device(s). A content may be, but is not limited to being, a graphic image, an audio stream, a video or text message, a movie file, etc.

As used in this description, the terms "component," "database," "module," "system," and the like are intended to broadly capture a computer-related entity, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device may be a component. Even so, although the terms are used broadly within the context of the description to establish a range of equivalents, narrower scopes of the terms may be defined within the context of the claims.

One or more components may reside within a process and/or thread of execution, and a component may be localized on one computer and/or distributed between two or more computers. In addition, these components may execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

In this description, the terms "communication device," "wireless device," "wireless telephone," "wireless communication device," "wireless handset" and portable computing device ("PCD") are used interchangeably. With the advent of third generation ("3G") and fourth generation ("4G") wireless technology, greater bandwidth availability has enabled more portable computing devices with a greater variety of wireless capabilities. Therefore, a portable computing device ("PCD") may include a cellular telephone, a pager, a PDA, a smartphone, a navigation device, a tablet personal computer ("PC"), or a hand-held computer with a wireless connection or link.

Embodiments of the systems and methods provide for unveiling multimedia contents, for example graphic images, in fragments at a time to users of a wireless communication network or the web until the entire presentation is revealed. When transmitted to the intended recipient or recipients, a mask layer that completely conceals the content simultaneously accompanies the presentation. The composition of the mask layer may comprise a varying number of fragments that, when removed, will reveal a portion of the media content rendered beneath. As time passes, and fragments of the mask layer are removed, the entire multimedia presentation rendered at a layer beneath the mask layer will be revealed to the recipient.

A user selectable "snippet" algorithm for generation and fragmental removal of the mask layer may be leveraged by some embodiments of the solution while in other embodiments all or part of the snippet algorithm may be predetermined. It is envisioned that, depending on embodiment, the sender of the multimedia content may control aspects of the snippet algorithm such as, but not limited to, the number of fragments that collectively form the mask layer, the rate of fragment removal for revealing portions of the multimedia content rendered beneath, the order of fragment removal, etc. It is also envisioned that a server in communication with the sender's device and the recipient device(s) may generate the snippet algorithm and/or mask layer so that revealing of the multimedia content is "randomized" to the sender.

It is envisioned that the rate of mask layer fragment removal dictated by a snippet algorithm may be any amount of time greater than instant and less than infinity. Moreover, it is envisioned that the order of removal for mask layer fragments may be selectable in some embodiments while in other embodiments it may be randomized. In a certain embodiment of the solution, it is envisioned that there are three components to the snippet algorithm for determining mask layer fragment removal (and, by extension, multimedia content reveal): 1) rate of fragment removal, 2) pattern of fragment removal, and 3) total number of removable fragments.

Certain embodiments may include a notification system configured to alert the recipient to an upcoming or pending incremental fragment removal. It is also envisioned that certain embodiments of an FRMC solution may provide a mechanism for an acceleration of the mask removal/multimedia content reveal; i.e., certain embodiments may allow the sender or a recipient to modify the snippet algorithm. Depending on embodiment, the ability to modify the snippet algorithm (such as for accelerated fragment removal or selectable fragment removal) may be earned by, for example, providing the recipient opportunity for performing certain actions including, but not limited to, remittance of money or something else of value, watching an advertising content, arriving at a geographic destination such as a storefront, etc.

It is also envisioned that embodiments of an FRMC solution may be applicable to media presentations that "disappear" by applying a snippet algorithm to fragmentally render a mask layer over a multimedia content instead of fragmentally removing a mask layer as described above and below. Essentially, it is envisioned that a snippet algorithm may be applied in some FRMC embodiments in a "reverse" manner from that which is primarily described herein. For example, if an entire multimedia content presentation is rendered to an intended recipient or recipients, a sender leveraging an embodiment of an FRMC solution may also control whether a mask layer appears covering the media content and how quickly or slowly and in what order the content becomes concealed.

Notably, although the preferred embodiments of an FRMC solution leverage a mask layer to effect a fragmented, time-wise reveal of a multimedia content, it is also envisioned that certain FRMC embodiments may not use a mask layer. For instance, certain FRMC embodiments may use a snippet algorithm that dictates fragmentation of the multimedia content itself and then "reveal" the multimedia content in full by reconstructing it one fragment at a time.

FIG. 1 is a high level diagram illustrating exemplary components of a system 100 for fragmented reveal of a multimedia content ("FRMC"). The system 100 includes a sender PCD 110A for capturing or creating a multimedia content and a recipient PCD 110C for receiving, rendering and revealing the multimedia content according to a snippet algorithm. The PCDs 110 each comprise a communications module 216, a processor 224, a display 232 and a snippet module 212. The PCDs 110 are in communication with each other through a communications network 130 that may be formed from a combination of any of the Internet, a cellular network, a Wifi network, a short messaging service ("SMS") network, the PSTN, etc. Similarly, the PCDs 110 are also in communication with a snippet server 105 via the network 130. The snippet server 105 may also include a snippet module 212B. Notably, the PCDs 110 and the snippet server 105 may comprise other components not shown in the FIG. 1 illustration (see FIG. 3 for a more detailed description of a PCD 110).

The sender PCD 110A may capture or create a multimedia content, such as a picture, and transmit (depicted as virtual link 140) the content to recipient PCD 110C via the communications network 130. In doing so, the sender PCD 110A may also leverage its snippet module 212A to generate all or part of a snippet algorithm. As described in more detail elsewhere herein, a snippet algorithm may work to generate a mask layer comprised of a plurality of mask fragments that is operable for rendering over the multimedia content. The snippet algorithm may further work to fragmentally remove the mask layer in order to "reveal" the media content rendered beneath. The number of mask layer fragments, rate of mask layer fragment removal, order of mask layer fragment removal, relative "opaqueness" or transparency of mask layer fragments, color of mask layer fragments, and other aspects of the snippet algorithm may be selectable or predetermined depending on embodiment.

Notably, the all or part of a snippet algorithm may be formed and/or executed according to the direction of any of the snippet modules 212, depending on the particular FRMC embodiment. In an exemplary embodiment, the snippet module 212A of the sender PCD 110A is leveraged by a user of PCD 110A to designate a captured media content for rendering on a recipient PCD 110C according to a snippet algorithm. In the example, the snippet module 212A may allow for the user of the PCD 110A to select the default "timing" of mask layer fragment removal at the recipient PCD 110C. Subsequently, the media content, the selected timing, and the identification of one or more target recipient PCDs (such as a phone number associated with PCD 110C) may be transmitted to snippet server 105. Snippet server 105, leveraging its snippet module 212B, may generate a comprehensive snippet algorithm using the sender designated timing constraints that is useful for instructing a recipient PCD 110C how to generate, render and fragmentally remove a mask layer.

The snippet server 105 may then forward the media content along with the comprehensive snippet algorithm to the recipient PCD 110C. In turn, the recipient PCD 110C may leverage its snippet module 212 to execute the comprehensive snippet algorithm such that a mask layer is rendered over the top of the media content before being systematically, and fragmentally, removed according to the snippet algorithm.

Embodiments of a system 100 for fragmented reveal of a multimedia content ("FRMC") have many potential advantages. Briefly, and to provide the basis for an exemplary, non-limiting application scenario in which aspects of some embodiments of the disclosed systems and methods may be suitably described, consider a merchant seeking to generate a "buzz" around an upcoming sale event and to motivate loyal customers to take advantage of the event. In such a situation, the merchant may generate a media content in the form of an advertisement for "50% off all merchandise" and blast the advertisement out via a text message to a loyal customer list. Using an FRMC embodiment, the advertisement may be delivered to the PCDs of the loyal customer list along with a snippet algorithm for "hiding" the advertisement with a mask layer. Next, over a course of a few days, the mask layer may be systematically removed via fragments to reveal the advertised offer, thereby building anticipation in the merchant's loyal customer base to see just "how much" the discount will be. Notably, in such a scenario, the FRMC embodiment may allow for the merchant to designate that the "last" fragment of the mask layer to be removed will be the fragment that is positioned over the key portion of the advertisement, namely the "50% off" portion in the example. Further, in such a scenario, the FRMC embodiment may allow for the recipients to modify the snippet algorithm to speed up the reveal process, such as by paying a fee or agreeing to be redirected to a manufacturer's website. Even further, it is envisioned that loyalty account data associated uniquely with a given customer of the merchant may be used to generate the snippet algorithm provided to that customer such that those customers who are "most loyal" may benefit from a faster reveal process.

Turning back to the FIG. 1 illustration, exemplary embodiments of a PCD 110 envision remote communication, real-time software updates, extended data storage, etc. and may be leveraged in various configurations by users of system 100. Advantageously, embodiments of PCDs 110 configured for communication via a computer system such as the exemplary system 100 depicted in FIG. 1 may leverage communications networks 130 including, but not limited to cellular networks, PSTNs, cable networks and the Internet for, among other things, software upgrades, content updates, database queries, data transmission, etc. Other data that may be used in connection with a PCD 110, and accessible via the Internet or other networked system, will occur to one of ordinary skill in the art.

The illustrated computer system 100 may comprise a snippet server 105 that may be coupled to a network 130 comprising any or all of a wide area network ("WAN"), a local area network ("LAN"), the Internet, or a combination of other types of networks. It should be understood that the term snippet server 105 may refer to a single server system or multiple systems or multiple servers. The server 105 may be coupled to a snippet database for storing various records related to, but not limited to, PCD user-specific contact or account information, historical content, snippet algorithms, filters/rules algorithms, etc.

When the server 105 is coupled to the network 130, the server 105 may communicate through the network 130 with various different PCDs 110 associated with users (senders and/or recipients) of a snippet service. Each PCD 110 may run or execute web browsing software or functionality to access the server 105 and its various snippet applications including snippet module 212B. Any device that may access the network 130 either directly or via a tether to a complimentary device, may be a PCD 110 according to the computer system 100. The PCDs 110, as well as other components within system 100 such as, but not limited to, a wireless router (not shown), may be coupled to the network 130 by various types of communication links 145. These communication links 145 may comprise wired as well as wireless links. The communication links 145 allow a PCD 110 to establish virtual links 140 with each other. While a virtual link 140 is depicted between the sender PCD 110A and the recipient PCD 110C, it is envisioned that an actual wired or wireless link 145 may exist between the PCDs 110A, 110C and/or between the PCDs and the server 105.

As briefly described above, a PCD 110 may include a display 232, a processor 224 and a communications module 216 that may include one or more of a wired and/or wireless communication hardware and a radio transceiver 217. It is envisioned that the display 232 may comprise any type of display device such as a liquid crystal display ("LCD"), a plasma display, an organic light-emitting diode ("OLED") display, a touch activated display, and a cathode ray tube ("CRT") display, a brail display, an LED bank, and a segmented display. A PCD 110 may execute, run or interface to a multimedia platform that may be part of a plug-in for an Internet web browser.

The communications module 216 may comprise wireless communication hardware such as, but not limited to, a WiFi card or NFC card for interfacing with snippet server 105 and/or another communications module 216 associated with a different PCD 110. Further, the communications module 216 may include a cellular radio transceiver to transmit a media content and all or a portion of a snippet algorithm as well as other information to exemplary snippet server 105, as depicted in the system 100 embodiment. One of ordinary skill in the art will recognize that a communications module 216 may include application program interfaces to processor 224.

Communication links 145, in general, may comprise any combination of wireless and wired links including, but not limited to, any combination of radio-frequency ("RF") links, infrared links, acoustic links, other wireless mediums, wide area networks ("WAN"), local area networks ("LAN"), the Internet, a Public Switched Telephony Network ("PSTN"), and a paging network. An exemplary PCD 110 may also comprise a computer readable storage/memory component 219 (shown in FIG. 3) for storing, whether temporarily or permanently, various data including, but not limited to, multimedia content, snippet algorithm aspects, mask layer data, etc.

Figure 2:
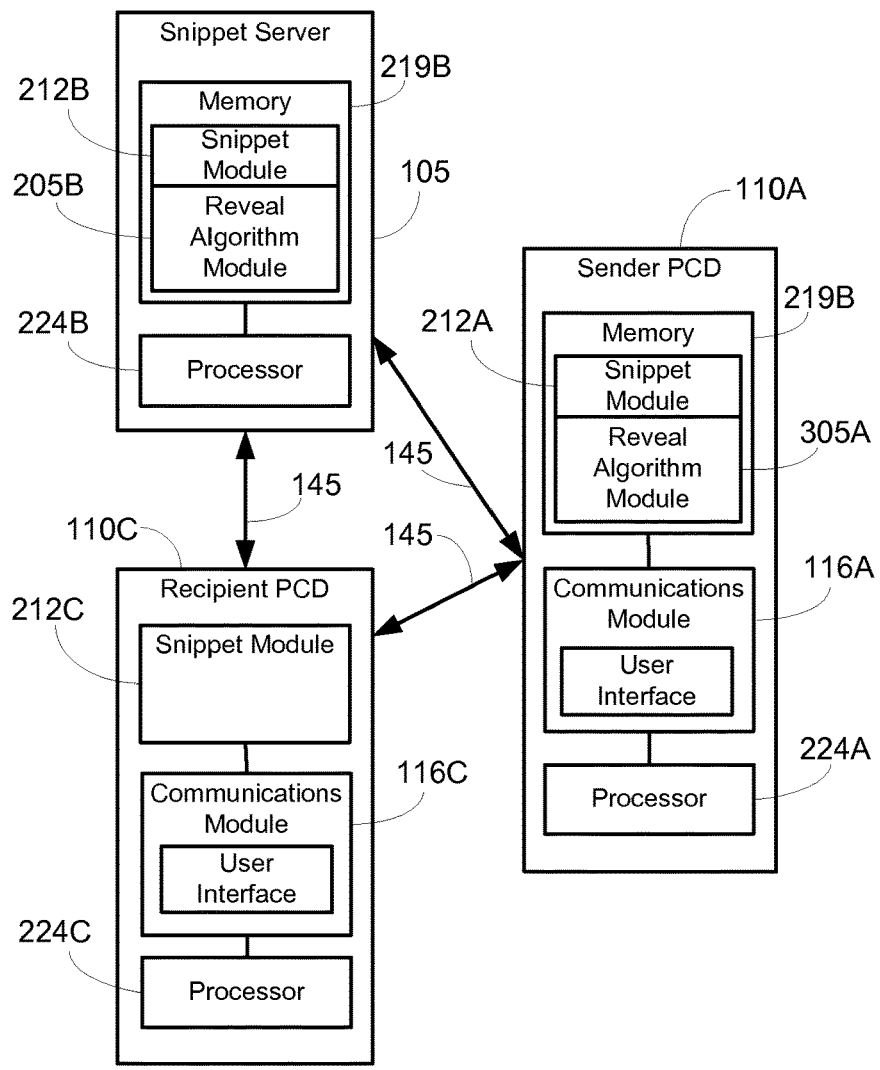
FIG. 2 is a diagram of an exemplary computer architecture for the system illustrated in FIG. 1.

Turning now to FIG. 2, a diagram of an exemplary computer architecture 101 for the system 100 illustrated in FIG. 1 is depicted. The exemplary architecture 101 may include a portable computing devices ("PCD") 110A and 110C. A snippet server 105 may be connected to the PCDs 110. The snippet server 105 may be connected to the PCDs 110 via communications links 145, such as a mobile telephone network. As noted previously, it should be understood that the term server 105 may refer to a single server system or multiple systems or multiple servers. One of ordinary skill in the art will appreciate that the various server arrangements may be selected depending upon computer architecture design constraints and without departing from the scope of the invention.

As illustrated in FIG. 2, the PCDs 110 may include a processor 224, a memory 219 (see FIG. 3), a snippet module 112 and a communications module 216 coupled to the processor 224. The memory 219 may include instructions for executing one or more of the method steps described herein. Further, the processor 224 and the memory 219 may serve as a means for executing one or more of the method steps described herein.

FIG. 2 shows that the snippet server 105 may include a processor 224B and a memory 219B coupled to the processor 224B. The memory 219B may include instructions for executing one or more of the method steps described herein. Further, the processor 224B and the memory 219B may serve as a means for executing one or more of the method steps described herein. As illustrated, the memory 219B may include a reveal algorithm module 205B that works with, or as part of, the snippet module 212B to generate a snippet algorithm that, when executed, creates a mask layer over a media content and then systematically removes the mask layer in fragments.

Figure 3:
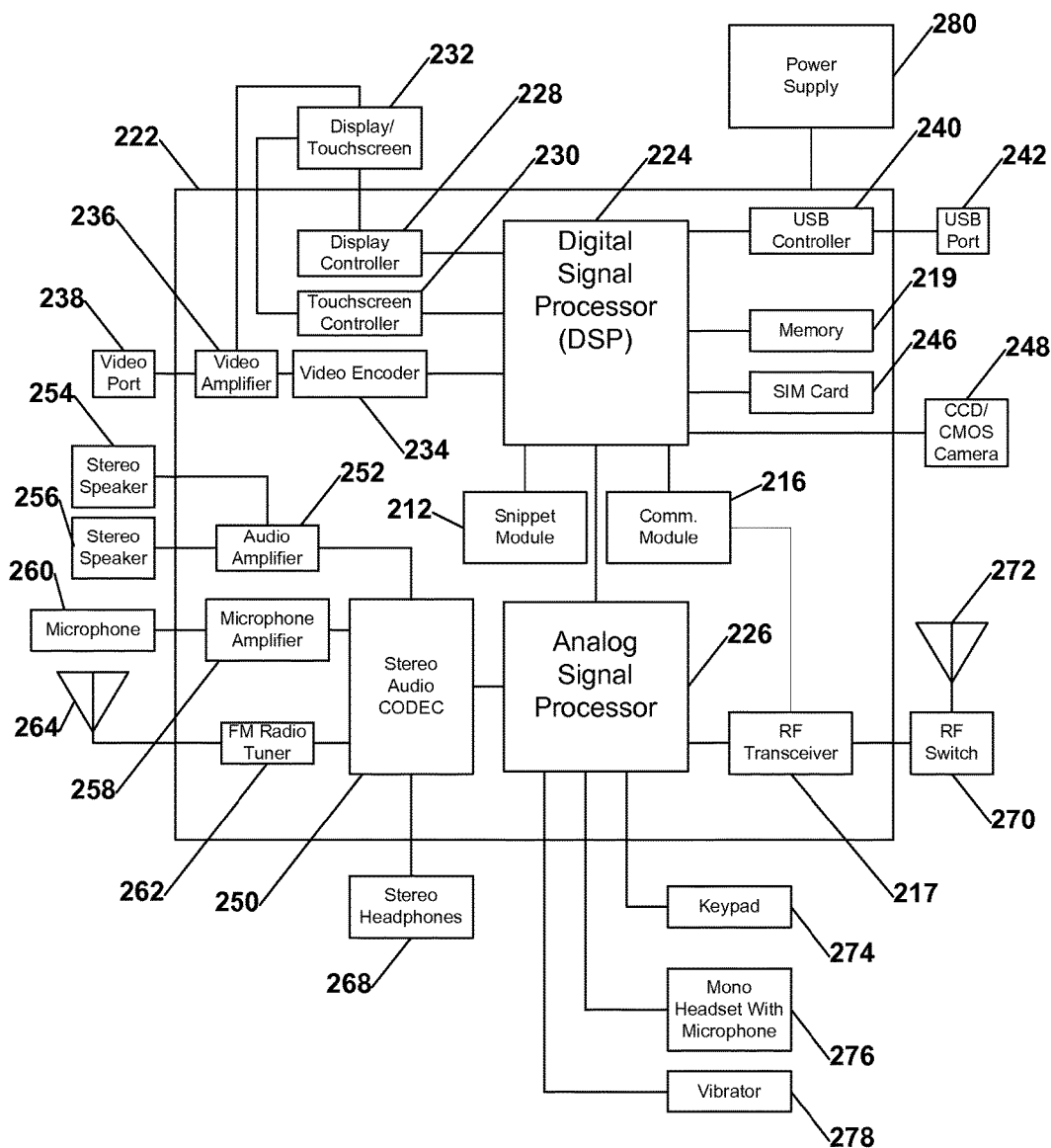
FIG. 3 is a diagram of an exemplary, non-limiting aspect of a portable computing device ("PCD") comprising a wireless telephone which corresponds with FIG. 1 and FIG. 2.

FIG. 3 is a diagram of an exemplary, non-limiting aspect of a portable computing device 110 ("PCD") comprising a wireless telephone which corresponds with FIG. 1 and FIG. 2. As shown, the PCD 110 includes an on-chip system 222 that includes a digital signal processor 224 and an analog signal processor 226 that are coupled together. As illustrated in FIG. 3, a display controller 228 and a touchscreen controller 230 are coupled to the digital signal processor 224. A touchscreen display 232 external to the on-chip system 222 is coupled to the display controller 228 and the touchscreen controller 230.

FIG. 3 further indicates that a video encoder 234, e.g., a phase-alternating line ("PAL") encoder, a sequential couleur avec memoire ("SECAM") encoder, a national television system(s) committee ("NTSC") encoder or any other video encoder, is coupled to the digital signal processor 224. Further, a video amplifier 236 is coupled to the video encoder 234 and the touchscreen display 232. A video port 238 is coupled to the video amplifier 236. A universal serial bus ("USB") controller 240 is coupled to the digital signal processor 224. Also, a USB port 242 is coupled to the USB controller 240. A memory 219 and a subscriber identity module ("SIM") card 246 may also be coupled to the digital signal processor 224. Further, a digital camera 248 may be coupled to the digital signal processor 224. In an exemplary aspect, the digital camera 248 is a charge-coupled device ("CCD") camera or a complementary metal-oxide semiconductor ("CMOS") camera.

As further illustrated in FIG. 3, a stereo audio CODEC 250 may be coupled to the analog signal processor 226. Moreover, an audio amplifier 252 may be coupled to the stereo audio CODEC 250. In an exemplary aspect, a first stereo speaker 254 and a second stereo speaker 256 are coupled to the audio amplifier 252. FIG. 3 shows that a microphone amplifier 258 may be also coupled to the stereo audio CODEC 250. Additionally, a microphone 260 may be coupled to the microphone amplifier 258. In a particular aspect, a frequency modulation ("FM") radio tuner 262 may be coupled to the stereo audio CODEC 250. Also, an FM antenna 264 is coupled to the FM radio tuner 262. Further, stereo headphones 268 may be coupled to the stereo audio CODEC 250.

FIG. 3 further indicates that a radio frequency ("RF") transceiver 217 may be coupled to the analog signal processor 226. An RF switch 270 may be coupled to the RF transceiver 217 and an RF antenna 272. As shown in FIG. 3, a keypad 274 may be coupled to the analog signal processor 226. Also, a mono headset with a microphone 276 may be coupled to the analog signal processor 226.

Further, a vibrator device 278 may be coupled to the analog signal processor 226. Also shown is that a power supply 280 may be coupled to the on-chip system 222. In a particular aspect, the power supply 280 is a direct current ("DC") power supply that provides power to the various components of the PCD 110 that require power. Further, in a particular aspect, the power supply is a rechargeable DC battery or a DC power supply that is derived from an alternating current ("AC") to DC transformer that is connected to an AC power source.

FIG. 3 also shows that the PCD 110 may include snippet module 212 and a communications module 216. As described above, the snippet module 212 may be operable work with the RF antenna 272 and transceiver 217 to establish communication with another PCD 110 (such as one or more recipient PCDs) and send a media content and snippet algorithm via a snippet server 105.

As depicted in FIG. 3, the touchscreen display 232, the video port 238, the USB port 242, the camera 248, the first stereo speaker 254, the second stereo speaker 256, the microphone 260, the FM antenna 264, the stereo headphones 268, the RF switch 270, the RF antenna 272, the keypad 274, the mono headset 276, the vibrator 278, and the power supply 280 are external to the on-chip system 222.

In a particular aspect, one or more of the method steps described herein may be stored in the memory 219 as computer program instructions. These instructions may be executed by the digital signal processor 224, the analog signal processor 226 or another processor, to perform the methods described herein. Further, the processors, 224, 226, the memory 219, the instructions stored therein, or a combination thereof may serve as a means for performing one or more of the method steps described herein.

Figure 4:
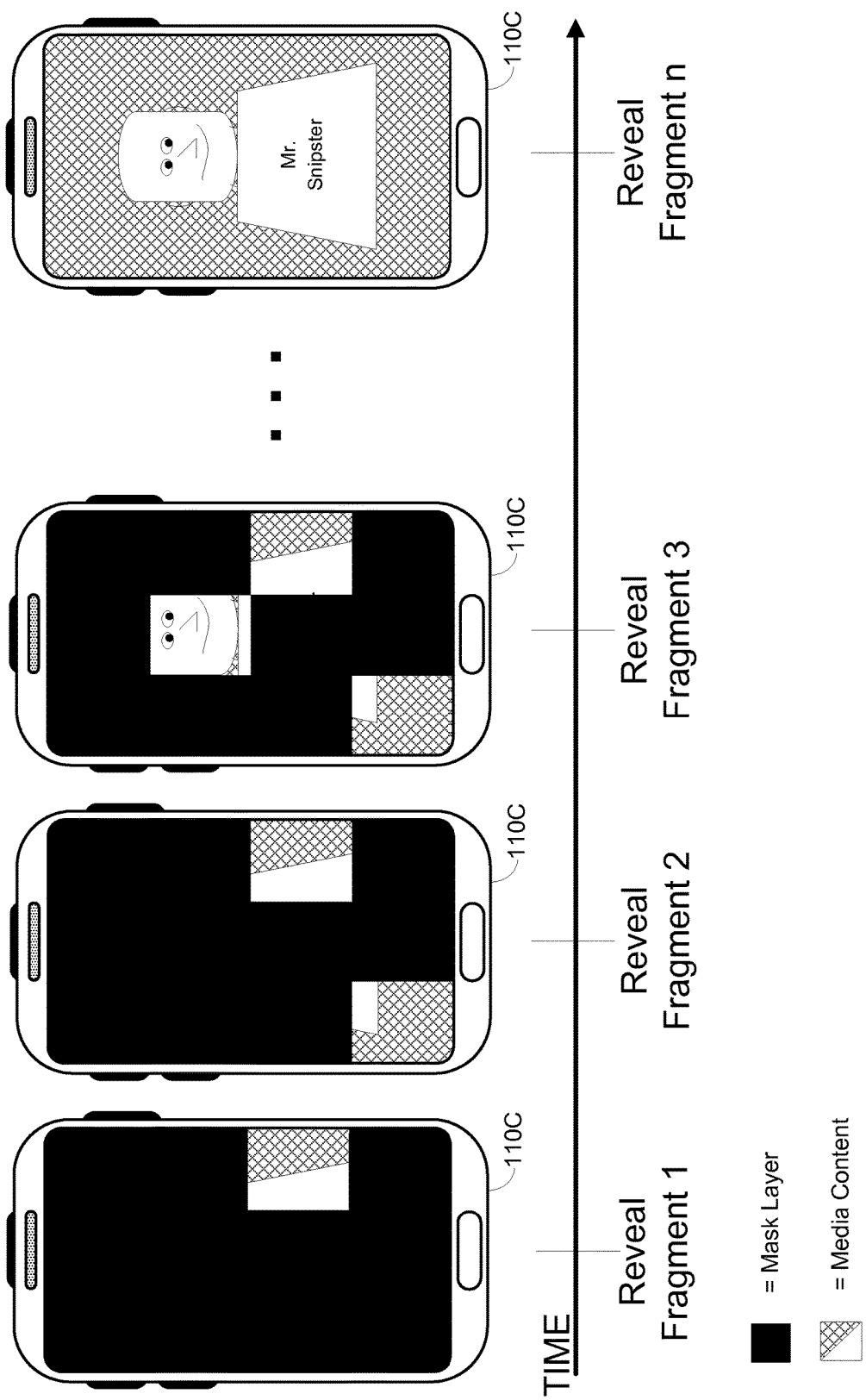
FIG. 4 is an exemplary illustration of a rendered output according to an embodiment of an FRMC solution.

FIG. 4 is an exemplary illustration of a rendered output on a recipient PCD 110C according to an embodiment of an FRMC solution. Beginning at the left of the FIG. 4 illustration, the recipient PCD 110C is depicted with its display rendering a media content (white/crosshatch) with a mask layer (black) obscuring the presentation. As described above, the mask layer may be defined by a snippet algorithm to "fill" the screen with a collection of mask layer fragments. At time Reveal Fragment 1, a first fragment of the mask layer is removed to reveal a portion of the underlying media content. As time passes, and according to the snippet algorithm, a second fragment of the mask layer is removed at time Reveal Fragment 2 and then a third fragment is removed at time Reveal Fragment 3. The systematic fragment removal continues in this way according to the particular snippet algorithm until the last fragment, Fragment n, defined by the snippet algorithm is removed such that the entire media content is presented for the benefit of the user.

Notably, it is envisioned that a user of an FRMC embodiment may be able to select which fragments are removed and when. In certain embodiments, a user of an FRMC embodiment may also determine how many fragments form a mask layer. Further, in some embodiments a user may modify a default snippet algorithm to change any one or more aspects of the algorithm. In some embodiments that allow modification of a default or initial snippet algorithm, the opportunity for modification may be subject to the user fulfilling some other requirement such as, but not limited to, paying a fee, viewing an advertisement content, using a code word or entering a code, etc.

Moreover, although it is not explicitly depicted in the Figures, it is also envisioned that certain FRMC embodiments may provide for communication between users of the system as the reveal process proceeds. For example, a sender of a media content to a plurality of recipients may simultaneously experience the reveal of the media content along with the recipients while the group (sender and recipients) engage in text or multimedia based communications regarding the ongoing reveal of the subject content.

Figure 5:
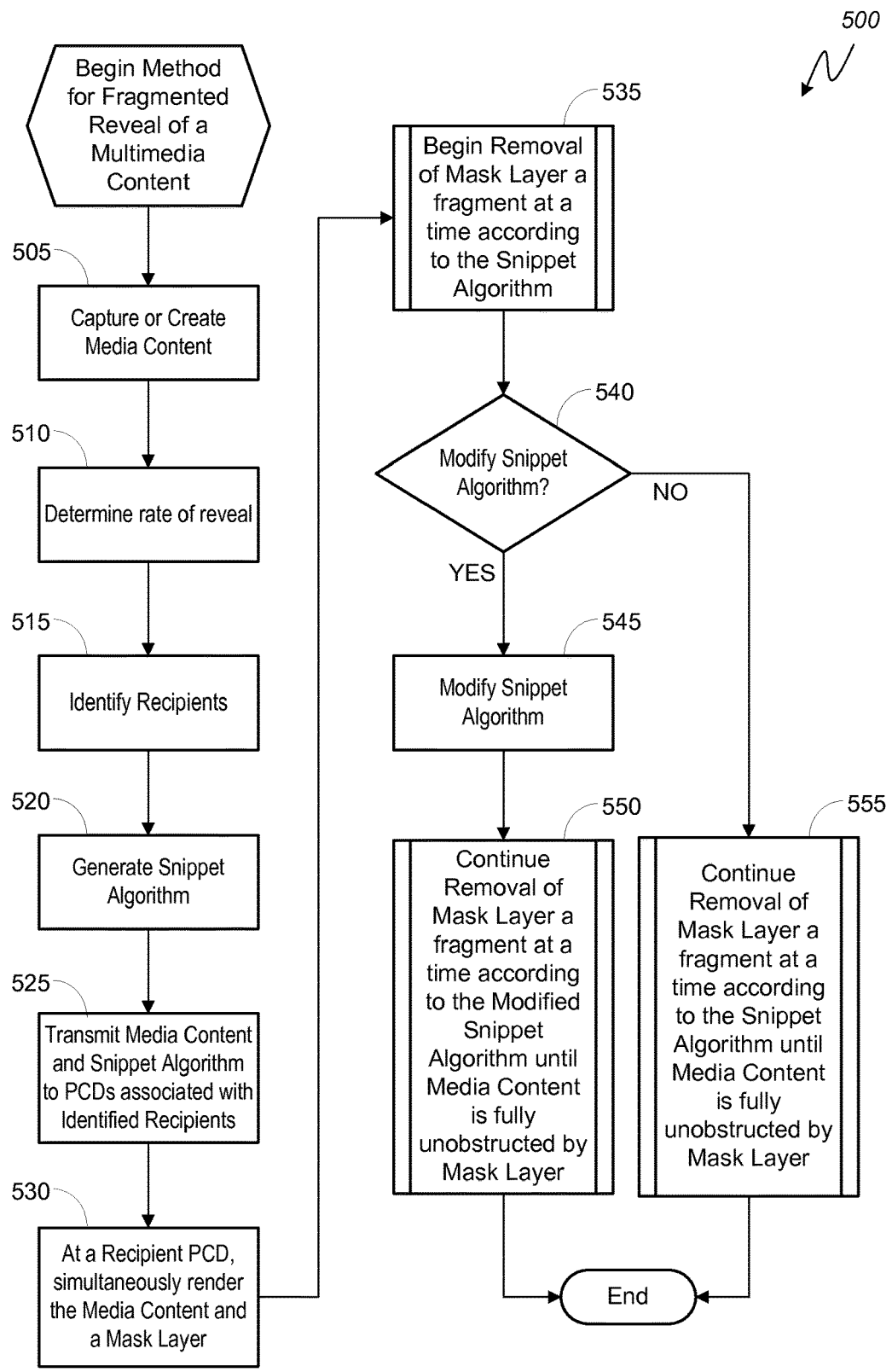
FIG. 5 illustrates an exemplary method for fragmented reveal of a multimedia content ("FRMC").

FIG. 5 illustrates an exemplary method 500 for fragmented reveal of a multimedia content ("FRMC"). Beginning at block 505, a media content may be captured or created by a sender device, such as a PCD 110A or functionally similar device. At block 510, the sender may determine the rate at which a mask layer will be removed to reveal the media content to a recipient (in some embodiments, the rate of reveal may be a predetermined rate and/or not selectable by the sender). At block 515, the sender identifies recipients of the media content, such as user associated with other PCDs 110. At block 520, a snippet algorithm is developed to define the generation of a mask layer and fragmented removal of the mask layer.

Next, at block 525, the media content and the snippet algorithm are transmitted to the recipients identified in block 515. Notably, although development of the snippet algorithm has been described herein as a collective effort of the snippet module 212A in a sender PCD 110A and the snippet module 212B in a snippet server 105, it is envisioned that in some embodiments the snippet modules 212A and 212B may work to only define parameters that are ultimately used by a snippet module 212C in a recipient device to develop and execute a snippet algorithm. That is, any combination of snippet modules 212 across devices in the system may work together to develop a particular snippet algorithm for generating and fragmentally removing a mask layer.

Returning to the method 500, at block 530 a recipient PCD 110 may leverage its snippet module 212C to render the media content and the mask layer such that the presentation of the media content to the user of the recipient device 110C is obscured by the mask layer. Next, at routine block 535, the mask layer is fragmentally removed over time and according to the snippet algorithm in order to reveal and present the underlying media content to the user of the recipient device.

At any time during the routine 535, decision block 540 may determine that the user of the recipient device desires to modify the snippet algorithm, such as for the purpose of speeding the fragmented, time-driven removal of the mask layer. If no modification of the snippet algorithm is allowed or desired, the method 500 follows the "NO" branch to routine 555 and the fragmented removal of the mask layer continues according to the default snippet algorithm. If, however, at decision block 540 the snippet algorithm is to be modified, the method 500 follows the "YES" branch to block 545 and the snippet algorithm is modified in a manner as described above. The method continues from block 545 to routine block 550 and the fragmented removal of the mask layer moving forward is accomplished according to the modified snippet algorithm. From either of routine blocks 550 and 555, the method 500 ends.

Certain steps in the processes or process flows described in this specification naturally precede others for the invention to function as described. However, the invention is not limited to the order of the steps described if such order or sequence does not alter the functionality of the invention. That is, it is recognized that some steps may performed before, after, or parallel (substantially simultaneously with) other steps without departing from the scope and spirit of the invention. In some instances, certain steps may be omitted or not performed without departing from the invention. Also, in some instances, multiple actions depicted and described as unique steps in the present disclosure may be comprised within a single step. Further, words such as "thereafter", "then", "next", "subsequently", etc. are not intended to limit the order of the steps. These words are simply used to guide the reader through the description of the exemplary method.

Additionally, one of ordinary skill in programming is able to write computer code or identify appropriate hardware and/or circuits to implement the disclosed invention without difficulty based on the flow charts and associated description in this specification, for example. Therefore, disclosure of a particular set of program code instructions or detailed hardware devices is not considered necessary for an adequate understanding of how to make and use the invention. The functionality of the claimed computer implemented processes is explained in more detail in the above description and in conjunction with the Figures which may illustrate various process flows.

In one or more exemplary aspects, the functions described may be implemented in hardware, software, firmware, or any combination thereof. If implemented in software, the functions may be stored on or transmitted as one or more instructions or code on a computer-readable device. Computer-readable devices include both computer storage media and communication media comprising any medium that facilitates transfer of a computer program from one place to another.

A storage media may be any available media that may be accessed by a computer. By way of example, and not limitation, such computer-readable media may comprise RAM, ROM, EEPROM, CD-ROM or other optical disk storage, magnetic disk storage or other magnetic storage devices, or any other medium that may be used to carry or store desired program code in the form of instructions or data structures and that may be accessed by a computer.

Also, any connection is properly termed a computer-readable medium. For example, if the software is transmitted from a website, server, or other remote source using a coaxial cable, fiber optic cable, twisted pair, digital subscriber line ("DSL"), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc ("CD"), laser disc, optical disc, digital versatile disc ("DVD"), floppy disk and blu-ray disc where disks usually reproduce data magnetically, while discs reproduce data optically with lasers. Combinations of the above should also be included within the scope of computer-readable media.

Therefore, although selected aspects have been illustrated and described in detail, it will be understood that various substitutions and alterations may be made therein without departing from the spirit and scope of the present invention, as defined by the following claims.

What is claimed is:

1. A method for fragmented presentation of a media content, comprising:
   receiving a media content at a recipient device;
   receiving a snippet algorithm, by the recipient device, corresponding to the media content, wherein the snippet algorithm is remotely configured;
   rendering the media content with a mask layer that obscures a presentation of the media content on a display of the recipient device, wherein the mask layer is operated according to the remotely configured snippet algorithm; and
   removing the mask layer according to the remotely configured snippet algorithm, wherein removal of a mask layer fragment operates to present a portion of the media content rendered below the fragment,
   wherein the remotely configured snippet algorithm is enabled to operate the mask layer with at least the following parameters:
   a number of fragments that form the mask layer,
   a rate of fragment removal, and
   an order of fragment removal, and
   wherein the parameters of the snippet algorithm are determined based on, at least in part, a characteristic of at least one of the following: the recipient device and an intended recipient associated with the recipient device, and wherein the parameters of the remotely configured snippet algorithm are remotely modifiable subsequent to the receipt of the media content by the recipient device.

2. The method of claim 1, wherein the remotely configured snippet algorithm is modifiable via a remote device such that the removal of the mask layer is altered.

3. The method of claim 2, further comprising modifying the remotely configured snippet algorithm via communication of instructions from the remote device to the recipient device.

4. The method of claim 3, wherein modifying the remotely configured snippet algorithm comprises one of receiving payment of a fee, displaying an advertisement content, and determining a location of the recipient device.

5. The method of claim 3, wherein a rate of removing the mask layer is user selectable by an operator of the remote device.

6. The method of claim 1, wherein the recipient device is in the form of a mobile computing device.

7. The method of claim 1, further comprising defining the parameters of the snippet algorithm, at least in part, by actions taken by the intended recipient associated with the recipient device.

8. A system for fragmented presentation of a media content, comprising:
   a first device configured to:
      receive the media content from a remotely located second device,
      receive a snippet algorithm associated with the media content from the second device, wherein the snippet algorithm is determined based on, at least in part, a characteristic of at least one of the following: the first device and an intended recipient associated with the first device,
      render the media content on a display of the first device,
      render a mask layer on the display according to the snippet algorithm, wherein the mask layer obscures a presentation of the media content, and
      remove the mask layer at least one fragment according to the snippet algorithm, wherein removal of a mask layer fragment operates to present a portion of the media content rendered below the fragment; and
   the second device configured to:
      transmit, to the first device, the media content;
      transmit, to the first device, the snippet algorithm associated with the media content, the algorithm being configured to control the operation of the mask layer on the first device, and
      transmit, to the first device, computer-executable instructions to configure parameters of the snippet algorithm, the computer-executable instructions being enabled to configure:
         a quantity of fragments for the mask layer,
         a rate of fragment removal for the mask layer, and
         an order of fragment removal for the mask layer,
      wherein the parameters of the snippet algorithm are modifiable subsequent to the transmission of the media content to from the second device.

9. The system of claim 8, wherein the snippet algorithm is modifiable, in subsequent transmissions of the snippet algorithm between the second device and the first device, such that the removal of the mask layer is altered.

10. The system of claim 9, further comprising means for modifying the snippet algorithm by the first device.

11. The system of claim 10, wherein the modifying the snippet algorithm by the first device comprises paying a fee, viewing an advertisement content, and a location of the first device.

12. The system of claim 11, wherein the rate of removing the mask layer is modified in response to one of the payment of a fee, the viewing of the advertisement, and the location of the first device.

13. The system of claim 8, wherein the first device is in the form of a mobile computing device.

14. The system of claim 8, wherein the parameters of the snippet algorithm are further defined, at least in part, by actions taken by the intended recipient associated with the recipient device.

15. A non-transitory computer readable media having a set of instructions, which when executed, implement a method for fragmented presentation of a media content, comprising:
   transmitting, to a recipient device, a media content;
   transmitting, to the recipient device, a remotely defined snippet algorithm for rendering the media content;
   rendering the media content with a mask layer that obscures a presentation of the media content on a display of the recipient device, wherein the mask layer is operated according to the remotely defined snippet algorithm with the following parameters:

a quantity of fragments for the mask layer,
a rate of fragment removal for the mask layer, and
an order of fragment removal for the mask layer,
wherein the parameters of the remotely defined snippet algorithm are determined, at least in part, by at least one of the following: a characteristic of the recipient device and a characteristic of an intended recipient associated with the recipient device, and wherein the parameters of the snippet algorithm are further defined, at least in part, by actions taken by the intended recipient associated with the recipient device;

removing the mask layer according to the parameters of the remotely configured snippet algorithm, wherein removal of a mask layer fragment operates to present a portion of the media content rendered below the fragment.

16. The non-transitory computer readable media of claim 15, wherein the snippet algorithm is modifiable, subsequent to the transmission of the media content, such that the removal of the mask layer is altered.

17. The non-transitory computer readable media of claim 15, further comprising modifying the snippet algorithm in response to subsequent instructions received from a remote device.

18. The non-transitory computer readable media of claim 17, wherein modifying the snippet algorithm comprises modifying the snippet algorithm in response to one of receiving payment of a fee, displaying an advertisement content, and determining a location of the recipient device.

19. The non-transitory computer readable media of claim 15, further comprising enabling a conversation between a remote device transmitting the media content and the snippet algorithm and the recipient device.

20. The system of claim 14, wherein the actions taken by the intended recipient comprise at least one of the following: the payment of a fee, the viewing of the advertisement, and the location of the first device.

* * * * *